United States Patent Office 2,905,649
Patented Sept. 22, 1959

2,905,649

AQUEOUS DISPERSIONS OF ELASTOMERIC POLYMERS AND METHOD OF PREPARATION

David Craig, John F. Jones, and Stephen T. Semegen, Cuyahoga Falls, Ohio, assignors to The B. F. Goodrich Company, New York, N.Y., a corporation of New York No Drawing. Application November 10, 1955
Serial No. 546,264

11 Claims. (Cl. 260—4)

This invention relates to aqueous dispersions of elastomeric polymers and to methods for making the same, and the invention relates more specifically to novel aqueous dispersions of elastomeric polymers comprising said elastomer, a particular type of water-insoluble interpolymer derivative, a fatty acid, and an alkaline material.

Aqueous dispersions of elastomeric polymers are a useful form of the polymer and many applications of polymer materials are based on the use of aqueous dispersions of said polymers. Many valuable elastomeric polymers are not available in aqueous dispersion or latex form as are natural rubber, copolymers of butadiene and styrene, copolymers of butadiene and acrylonitrile and the like; for example, interpolymers of a major proportion of an isoolefin such as isobutylene and a minor proportion of a polyolefin such as isoprene or butadiene. These latter interpolymers are prepared by polymerizing monomeric mixtures in an organic medium and latices as such are unknown. For many years it has been an object of those skilled in the art to prepare useful aqueous dispersions of these elastomers. In spite of many years of effort this goal has not been satisfactorily achieved. The most successful dispersions have required use of large amounts of resins or inorganic materials, particularly the clays, large amounts of soaps and protein materials, which often are undesirable when present in dispersions. Elastomeric polyurethanes are another class of valuable polymers which cannot be prepared from the basic raw materials in aqueous dispersions. These elastomers are ordinarily prepared in bulk and because of the reactive nature of the polyisocyanates used to make elastomeric polyurethanes water is present only as a reactant in some systems, and it is not possible to prepare these elastomers directly in the form of latices or aqueous dispersions. It is desirable, therefore, to make available to the art aqueous dispersions of elastomeric polyurethanes. It is a primary object of this invention to make available to the art, readily prepared, stable, aqueous dispersions of elastomeric polymers, which dispersions do not also contain large amounts of undesirable adulterants. Other objectives will become apparent from the description of the invention which follows.

This invention now provides valuable aqueous dispersions of elastomeric polymers and a method for making the same. The dispersions comprise an elastomeric polymer, a small amount of a fatty acid, a small amount of a hereinafter defined water-insoluble cross-linked interpolymer ester derivative, a small amount of a monobasic material, and water, intimately mixed together. The novel dispersions are fluid and exceptionally stable, are free of undesirable adulterants and fillers, and are quite valuable and useful as coating and impregnating materials and in a variety of other formulations.

To prepare the dispersions of the invention, the elastomeric polymer is placed in a suitable mixing apparatus and a small amount of a long chain fatty acid and a small amount of a partial ester derivative of a cross-linked interpolymer of a dicarboxylic acid anhydride and vinyl alkyl ether are intimately mixed therewith. The mixture is then treated with an aqueous solution of a basic material sufficient to adjust the pH of the mixture to about 7 or greater. After the addition of the basic solution, additional water is added slowly to the rubber-like mixture. During the process a phase inversion takes place, that is, the elastomer becomes dispersed in the water, and more water is added to obtain the desired dilution.

The fatty acid may be varied from as low as 1% or lower and to as high as 10% or more, but about 3 to 7 weight parts per 100 weight parts of elastomer are preferably employed. The fatty acids employed ordinarily are long-chain aliphatic monocarboxylic materials containing 12 to 30 carbon atoms, preferably 14 to 18 carbon atoms, such as lauric, myristic, palmitic, stearic, oleic and the like. Preferred is stearic acid. Mixtures of fatty acids may be employed.

The amount of water-insoluble interpolymer ester derivatives employed may be varied from about 1 to about 10 or more weight parts. Dispersions can be made with as low as 1 weight part of interpolymer derivative but ordinarily such dispersions lack the desired stability. Amounts as high as 10 weight parts or more result in increased water sensitivity of the elastomeric polymer product from the dispersion and are not preferred. Preferably an amount of interpolymer ester derivative from about 2.5 weight parts to 7.5 weight parts is employed. About 3.5 to 5 weight parts is an optimum amount whereby one obtains most readily the most stable aqueous dispersion with minimum water sensitivity of interpolymer product when deposited from the dispersion.

The amount of basic or alkaline material employed, which is preferably ammonium hydroxide, should be enough to maintain the aqueous dispersion at a pH greater than about 7, preferably about 8 to about 11. It is essential that the water-insoluble interpolymer ester derivative be at least partly neutralized after mixing in the elastomeric polymer so that it will swell and take up water. When using ammonium hydroxide, an excess can be employed if desired with no harmful effects since the excess is easily removed during the processing operation. Other monobasic materials can be used such as sodium hydroxide, potassium hydroxide, ammonium carbonate, water-soluble amines and the like in water solution, but one must be careful to add only the required and calculated amount of these materials in dilute water solution slowly to the mixture to adjust the pH to greater than about 7. Much preferred for ease and flexibility of operations and actually superior dispersions is ammonium hydroxide.

The ingredients necessary to prepare the aqueous dispersions of this invention can be mixed into the polymer in any type of mixer known to those skilled in the art. The complete process can be conducted on a rubber or plastic mill until the mixture falls off the mill at which point the mixture is then placed into a suitable container and agitated during the remainder of the process, or the entire process may be carried out in a suitable internal mixer. Preferably the elastomeric polymer, a fatty acid and the water-insoluble interpolymer ester derivative are mixed on a tight rubber mill to insure an adequate, uniform and intimate incorporation and then the ammonium hydroxide and water are added in an internal mixer. The ammonium hydroxide should be added slowly so as to keep some measure of control over the particle size of the resulting dispersion, if added too rapidly and in large amounts, larger particle size dispersions are obtained. Further, the addition of water should also be slow in the early stages. The phase inversion is visible to the eye and may be otherwise determined by viscosity measurements and the like and control of this step is within the knowledge of those skilled in the art. The amount of water added may be varied quite widely depending upon the total solids desired in the final dispersion.

Very valuable aqueous dispersions of a high total solids content are made from a mixture of an elastomeric polymer, stearic acid, a water-insoluble cross-linked interpolymer partial ester derivative of a maleic anhydride and vinyl methyl ether polymer cross-linked with about 1% of allyl sucrose, which interpolymer is reacted with (1) diethyl aminoethanol in an amount equivalent to about 25% esterification or (2) lauryl alcohol in an amount equivalent to about 10% esterification to form the partial ester derivative, and ammonium hydroxide, all in intimate dispersion in water.

The water-insoluble cross-linked interpolymer ester derivatives may be prepared by reacting a dicarboxylic acid anhydride with a vinyl alkyl ether and a polyalkenyl polyether of a polyhydric alcohol and then preparing the partial ester derivative with an alcohol or aminoalcohol.

The dicarboxylic acid anhydrides useful in the production of the basic interpolymers for use in this invention have the general structure:

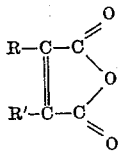

wherein R and R' are selected from the group consisting of hydrogen, halogen, cyano (—C≡N), alkyl, aryl, alkaryl, aralkyl, and cycloaliphatic groups. Illustrative anhydrides of this structure include maleic anhydride itself, chloromaleic anhydride, 2,3-dicyanomaleic anhydride, dimethyl maleic anhydride, diphenyl maleic anhydride, dibenzyl maleic anhydride, di-(p-methylphenyl) maleic anhydride, dicyclohexyl maleic anhydride and others. Maleic anhydride, because of its ready availability, low cost and highly satisfactory performance is the preferred monomer of this group.

In the production of the basic interpolymers for use in this invention, any of the vinyl alkyl ethers containing from 3 to 10 carbon atoms may be utilized. Included within this class are vinyl methyl ether, vinyl ethyl ether, vinyl isopropyl ether, vinyl n-butyl ether, vinyl isobutyl ethers, vinyl hexyl ethers and vinyl 2-ethylhexyl ethers. It is preferred, however, to utilize the lower vinyl alkyl ethers wherein the alkyl group contains from 1 to 4 carbon atoms, that is, vinyl methyl ether, vinyl ethyl ether, vinyl isopropyl ether, vinyl isobutyl ethers and vinyl n-butyl ether. Of these, vinyl methyl ether is much preferred because of its favorable reaction characteristics with maleic anhydride and because of its generally lower cost.

The third essential monomeric material is a polymerizable material which contains a plurality of polymerizable $CH_2=C<$ groupings and which is reactive with maleic anhydride and vinyl ether type monomers. A preferred class of cross-linking agents because of their ability to produce water-insoluble interpolymers which are resistant to hydrolysis are selected from the class consisting of polyunsaturated hydrocarbons, solvent-soluble polymeric open-chain aliphatic conjugated dienes and polyalkenyl polyethers of polyhydric alcohols containing at least 4 carbon atoms and at least 3 hydroxyl groups, all of which contain a plurality of polymerizable $CH_2=C<$ groupings, the double bonds of which are not in conjugated relationship one with the other. The amount of cross-linking agent can vary from about 0.01% to about 5% by weight of the other monomers, more preferably 0.5 to 2.0%. Preferred are the polyalkenyl polyethers of polyhydric alcohols such as the polyallyl ether of sucrose.

The polyalkenyl polyethers useful in this invention contain more than one alkenyl ether grouping per molecule and those most useful possess alkenyl groups in which an olefinic double bond is present attached to a terminal methylene grouping thusly $CH_2=C<$. They are made by the etherification of a polyhydric alcohol containing at least 4 carbon atoms and at least 3 hydroxyl groups. Compounds of this class are readily produced, for example, by a Williamson-type synthesis, in which an alkenyl halide, or a mixture of such halides, such as allyl chloride, allyl bromide, methallyl chloride, methallyl bromide and others, is reacted with a strongly alkaline aqueous solution of one or more of the polyhydric alcohols. The product of such a synthesis usually is a complex mixture of polyethers containing varying numbers of ether groups on each molecule. Analysis of such materials, therefore, reveals only the average number of ether groupings on each molecule. These mixtures, however, if they analyze as containing an average number of ether groups per molecule greater than one, are capable of producing the insoluble carboxylic polymers of this invention. Since the efficiency of the polyether cross-linking agent increases with the number of potentially polymerizable groups on the molecule, it is much preferred to utilize polyethers containing an average of two or more alkenyl ether groupings per molecule. The polyvinyl polyethers of the polyhydric alcohols within the above broad class are produced by reacting acetylene with the polyhydric alcohol (or an alcoholate thereof) in a Reppe-type vinylation synthesis. The polycrotyl ethers of the polyhydric alcohols also are useful although they do not contain a terminal $CH_2=C<$ grouping.

Illustrative polyhydric alcohols of the above-described class that may be utilized in the preparation of the polyalkenyl polyether cross-linking agent include the butanetriols such as 1,2,3-butane triol, 2,3,4-trihydroxy butyric acid, the aldotetroses such as erythrose and threose, ketotetroses such as erythrulose; the aldopentoses such as arabinose, xylose, lyxose, and ribose; ketopentoses such as araboketose and xyloketose; aldohexoses such as glucose, galactose, mannose, gulose, idose, talose, allose and the like; ketohexoses such as fructose or levulose, sorbose and the like; other sugars including the mono-, di-, tri- and polysaccharides such as sucrose, maltose, lactose and raffinose; the hexosans, pentosans and hexosan-pentosans; the galactomannan and glucomannan gums, starch and others; reduced forms of the above and other sugars and polysaccharides such as the so-called "sugar alcohols" erythritol, xylitol, mono-, di- and tripentaerythritol, arabitol, mannitol, iditol, tolitol, sorbitol, inositol, dulcitol, and others; the oxidized derivatives of the sugars in which the oxidation has not been carried to the point where the original monosaccharide carbon chain unit is broken such as the mono- and dicarboxylic "sugar acids" including gluconic acid, glucuronic acid, galactonic acid, galacturonic acids, saccharic acid, mucic and pectic acids and other polyhydric alcohols of the class described.

A preferred class of polyhydric alcohols for use in the production of the polyalkenyl polyether monomer are known as the oligosaccharides, which are defined as containing from one to four monosaccharide units. As used herein the term "oligosaccharides" includes the sugars themselves, their reduction products such as the alcohols, keto-alcohols and aldo-alcohols and their oxidation products which retain the original saccharide chain such as the sugar acids, the keto-acids, the aldo-acids and the like. Illustrative saccharides of this class are the monosaccharides such as glucose, galactose, fructose, sorbose, rhamnose, and the like, disaccharides such as sucrose, arabinose, maltose, lactose, and the like, trisaccharides such as raffinose and others. Of these the disaccharides, i.e., sucrose, are much preferred because of ready availability and ability to produce polyethers of great reactivity with carboxylic monomers.

Since the maleic acid type of dicarboxylic acid anhydride evidences a strong tendency to form alternating copolymers with most of the monomers copolymerizable therewith, it is difficult to utilize monomeric proportions other than those adapted to yield the alternating polymer. In multicomponent interpolymers such as are described above, it is greatly preferred therefore to utilize monomeric mixtures in which the alpha-beta unsaturated acid anhydride and vinyl alkyl ether monomers in substantially equimolar proportions, and varying the amount of cross-linking agent to obtain the properties desired in the polymer. If proportions of alpha-beta unsaturated acid and vinyl alkyl ether other than equimolar are utilized, the yield of polymer is reduced and the polymer obtained will usually contain a relatively greater proportion of cross-linking agent than is represented in the original monomeric charge. In addition to the three essential monomers described above, up to 20% of the total monomeric mixture may consist of one or more other monoolefinic monomers such as styrene, acrylonitrile, vinyl chloride, vinylidene chloride, vinyl acetate, vinyl benzoate, diethyl maleate, ethylene, isobutylene, acrylic acid, and others. It is greatly preferred, however, that only the three essential monomeric materials be utilized.

The ester derivatives of this invention are prepared by reacting the carboxyl containing interpolymer of a dicarboxylic acid anhydride, a vinyl alkyl ether and a small amount of a polyalkenyl polyether with an alcohol or an amino-alcohol. There is a strong tendency for the interpolymer to readily form a partial ester. The reaction to form the partial ester is generally conducted in a diluent medium, at temperatures of 100° C. or lower, more preferably at 50 to 80° C. The esterification reaction is facilitated by the addition of very small amounts of a strongly alkaline amine such as pyridine, or other alkaline catalyst. When it is desired to convert substantially all of the anhydride groups to the half ester, which is not necessarily desirable, a fairly large excess of up to 2 or 3 equivalent proportions of alcohol is required.

The preparation of the useful water-insoluble interpolymer ester derivatives is now described. Molar equivalents of maleic anhydride and vinyl methyl ether and about 1% of allyl sucrose based on the combined weight of maleic anhydride and vinyl methyl ether are dissolved in benzene. The allyl sucrose has an average of about 5.6 to 5.8 allyl groups of each sucrose molecule. A solution containing the reactants is placed in a reactor, 1% of benzyl peroxide is added and the mixture heated at 50° C. for about 12 hours. The polymer forms as a finely divided white polymer which is insoluble in benzene. Esters of the acid anhydride polymers may be prepared by adding to the benzene polymer slurry the desired alcohol or aminoalcohol. Preferably a trace of an esterification catalyst such as pyridine is added to the mixture of polymer and alcohol and the mixture heated to about 70° C. for several hours. Very valuable derivatives are obtained from such primary alcohols as lauryl alcohol and such aliphatic tertiary aminoalcohols as diethylaminoethanol. In the case of the lauryl alcohol 10% esterification is achieved quite readily, and in the case of the diethyl aminoethanol 25% esterification is achieved readily. Other ester derivatives are readily prepared from primary aliphatic alcohols containing from 6 to 18 carbon atoms such as octyl alcohol, nonyl alcohol, heptyl alcohol, preferably from 8 to 14 carbon atoms; and from aliphatic t-aminoalcohols containing from 4 to 16 carbon atoms and preferably 4 to 10 carbon atoms such as dimethylaminoethanol, diethylaminopropanol and the like of degrees of esterification up to formation of the complete half ester. Usually 10% to 25% esterification results in valuable derivatives for the process of this invention although esterification up to the half ester may be employed. Useful interpolymer ester derivatives are also obtained from other maleic acid derivatives such as chloromaleic anhydride and other vinyl alkyl ethers such as ethyl, propyl, and butyl vinyl ether. The examples demonstrate use of the abovedescribed derivatives.

Any solid elastomeric polymer may be provided as an aqueous dispersion by this invention. Such polymers preferably have a Mooney viscosity value after 4 minutes at 212° F., with a large rotor, of about 25 to about 150. Aqueous dispersions also can be made with softer and tougher elastomers so long as the polymer can be worked in an internal mixer or can be processed on a mill, but the elastomers more preferably have a Mooney value of about 35 to about 90 ML.

Valuable aqueous dispersions are made from isoolefin-polyolefin interpolymers which are solid, plastic, rubbery interpolymers containing a major proportion, desirably from 70 to 99 weight percent, of an isoolefin generally containing from 4 to 8 carbon atoms such as, most desirably, isobutylene or, alternatively, 3-methyl-butene-1, 4-methyl-pentene-1, 2-ethyl-butene-1, 4-ethyl-pentene-1 or the like or a mixture of such isoolefins, with a minor proportion, desirably from 1 to 30 weight percent, of a polyolefinic hydrocarbon generally containing from 4 to 18 carbon atoms, preferably 4 to 8 carbon atoms, or two, three or more such hydrocarbons, including the following:

(1) Preferably acyclic or open-chain conjugated diolefins such as butadiene-1,3, isoprene, 2,4-dimethyl-butadiene-1,3, piperylene, 3-methyl-pentadiene-1,3, hexadiene-2,4, 2-neopentyl-butadiene-1,3, and the like;

(2) Acyclic non-conjugated diolefins such as dimethallyl and its homologs containing 2 to 6 carbon atoms interposed between the two isopropenyl radicals, 2-methyl-hexadiene-1,5, 2-methyl-pentadiene-1,4, 2-methyl-heptadiene-1,6, 2-methyl-heptadiene-1,4 and other tertiary non-conjugated diolefins having one double bond in the terminal position attached to a tertiary carbon atom;

(3) Alicyclic diolefins, both conjugated and non-conjugated such as cyclopentadiene, cyclohexadiene, 1-vinyl-cyclohexene-3, 1-vinyl-cyclohexene-1, 1-vinyl-cyclopentene-1, 1-vinyl-cyclobutene-2, dicyclopentadiene, and the like as well as monocyclic diolefinic terpenes such as dipentene, terpienes, terpinolene, phellandrenes, sylvestrene and the like;

(4) Acyclic triolefins such as 2,6-dimethyl-4-methylene-heptadiene-2,5, 2-methyl-hexatriene-1,3,5 and other conjugated triolefins, as well as myrcene, ocimene, alloocimene and the like;

(5) Alicyclic triolefins such as fulvene, 6,6-dimethyl-fulvene, 6,6-methyl-ethyl-fulvene, 6-ethyl-fulvene, 6,6-diphenyl-fulvene, 6-phenyl-fulvene and other fulvenes of the formula

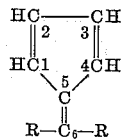

wherein each R is hydrogen, alkyl, cycloalkyl or aryl; as well as other alicyclic triolefins such as 1,3,3-trimethyl-6-vinyl-cyclohexadiene-2,4, cycloheptatriene etc.;

(6) Higher polyolefins such as 6,6-vinyl-methyl-fulvene (a tetraolefin) and 6,6-diisopropenyl-fulvene (a pentaolefin); and, (7) Polyolefinic hydrocarbons containing aromatic nuclei such as the phenyl butadienes, divinyl benzenes, diallyl benzenes, vinyl allyl benzene and divinyl naphthalenes.

The preferred solid, plastic, rubbery interpolymers are generally themselves prepared by low temperature (temperatures range from 0° C. to as low as −165° C. are generally about −100° C.) interpolymerization reaction utilizing an appropriate catalyst, generally an active metal halide or Friedel-Crafts type catalyst such as aluminum chloride or boron trifluoride, dissolved in a solvent with a low freezing point such as methyl or ethyl chloride, butane and the like and when so prepared, generally possess an average molecular weight above 15,000 and usually as high as 500,000 or higher, Mooney values averaging about 30 to 90 ML, iodine numbers in the range of 0.5 to 50, and are reactive with sulfur to yield elastic products on suitable heating. Of the preferred interpolymers, we find it most desirable in preparing the aqueous dispersions of this invention to utilize the solid, plastic interpolymers of isobutylene with small amounts of isoprene or butadiene, of the character of Butyl rubbers which contain about 95 to 99 weight percent of isobutylene and 1 to 5 weight percent of aliphatic conjugated diolefin preferably containing 4 to 6 carbon atoms such as isoprene.

It is to be understood that in addition to the preferred materials set forth above, any of the other known isoolefin interpolymers, including chlorosulfonated and halogenated Butyl rubber derivatives such as brominated Butyl rubber which is described in U.S. Patent 2,631,984, as well as polyisobutylene itself, may also be utilized.

Valuable aqueous dispersions of high polymer solids content also are made from elastomeric polyurethanes. These elastomers are ordinarily prepared by reacting a polyester, which is preferably hydroxyl terminated, a polyesteramide or a polyether glycol with a polyisocyanate, often with other reactive additives such as water, ethylene glycol and the like. Elastomeric polyurethanes of this nature and the preparation thereof are described in U.S. Patents 2,630,516, 2,621,166, 2,625,531, 2,625,532, 2,625,535, 2,692,873, 2,696,874 and 2,702,797. Elastomeric polyurethanes may be readily prepared by reacting about equimolar proportions of an aromatic diisocyanate such as 1,5-naphthylene diisocyanate, p-phenylene diisocyanate, 2,4-tolylene diisocyanate and the like with an essentially hydroxyl terminated polyester having a molecular weight from about 500 to about 5000, preferably from about 800 to about 2000. Other elastomeric polyurethanes are prepared by reacting one mole of a polyether glycol such as polytetramethylene ether glycol of molecular weights from about 2000 to 4000 with about two moles of an aromatic diisocyanate and about one-half mole of water. Other techniques include many obvious variations and are known to those skilled in the art, many of which are set forth in the above cited patents in more detail. In any event, so long as an elastomeric (rubber like) polyurethane is formed it may be used in the process of this invention to provide valuable aqueous dispersions of elastomeric polyurethanes.

Another class of valuable solid elastomeric polymers readily formed into useful aqueous dispersions as provided by this invention are halogenated and chlorosulfonated derivatives of ethylene polymers. These elastomeric polymers, preferably halogenated polyethylene, contain less than about 30% halogen, preferably about 25 to 30% chlorine.

Representative embodiments, representing the practice of the invention, will be found in the following examples.

*Example I*

In a typical embodiment of the invention 100 weight parts of a Butyl rubber prepared by polymerizing a monomer mixture of about 3% isoprene and about 97% isobutylene which contains about 2.2 mole percent unsaturation and has a Mooney value of about 40 ML is placed on a rubber mill, 5 weight parts of stearic acid and 5 weight parts of a maleic anhydride-vinyl methyl ether-allyl sucrose interpolymer-diethylamino ethyl ester are milled into the polymer. The stearic acid is completely incorporated first so as to have an easier working rubber and then the interpolymer ester derivative is milled into the rubber. Concentrated ammonium hydroxide is slowly added while milling the above mixture and after about 20 minutes to one hour the batch inverts, that is, the continuous phase gradually changes from rubber to water and results in a paste that falls off the mill. This paste can then be further diluted with water, while continuing agitation, to the desired degree.

*Example II*

In another embodiment of the invention 800 grams of a Butyl rubber containing about 1.6 mole percent unsaturation derived from isoprene is placed on a tight two-roll rubber mill and 40 grams of stearic acid is carefully incorporated therein. 28 grams of maleic anhydride-methyl vinyl ether-allyl sucrose interpolymer-lauryl partial ester derivative is then incorporated into the rubber-stearic acid mixture. This mixture is then placed in a dough-type mixer and 15 grams of 28% ammonium hydroxide diluted with 50 grams of water is slowly added thereto over a period of 1 to 2 hours. Slow addition of the ammonium hydroxide aids in keeping the particle size of the dispersed rubber low. The pH of the mixture at this point should be greater than 7. 200 grams of water is then dropped into the mixture at the rate of about 1 drop every 5 seconds. An additional 200 grams of water is added at the rate of about 1 drop per second. During this process phase inversion is noted wherein the continuous phase is no longer rubber which contains water but is a continuous phase of water containing rubber. An additional 500 grams of water is added to produce an aqueous dispersion of Butyl rubber in water containing about 45% total solids. The average particle size of the polymer particles is about 5000 A. and the latex is quite stable, both to mechanical influences and storage. The dispersion may be employed to coat fabric and the like and is a valuable base material for making adhesive formulations. Continuous polymer films are readily laid down from these dispersions. If desired, the polymer may be coagulated by adding concentrated sodium hydroxide to the dispersion and then adding this mixture to hot, dilute, hydrochloric acid. Small amounts of bromine and other halogens can be added to this dispersion in order to produce brominated Butyl rubber of the types described in U.S. Patent 2,631,984. The dispersions also can be readily mixed with aqueous dispersions of other polymers if desired.

*Example III*

100 weight parts of a polyesterurethane gum prepared by reacting one mole of hydroxyl polyethylene adipate having a molecular weight of about 1200 and 0.3 mole of water with 1.25 moles of paraphenylene diisocyanate is placed on a rubber mill, 5 weight parts of stearic acid are added and mixed into the elastomer and then 3.5 weight parts of a maleic anhydride-vinyl methyl ether-allyl sucrose interpolymer-diethyl amino ethyl ester is milled into the elastomer. The mixture is then placed in an internal mixer and ammonium hydroxide solution is slowly added to the mixture which slowly forms a paste. This paste is diluted slowly with additional water while continuing agitation to a polymer solids content of 28%. When a film from this basic dispersion is heated to dryness a tough, elastic, continuous film product is obtained. When this example is repeated with a partial lauryl ester derivative of maleic anhydride-methyl vinyl ether-allyl sucrose interpolymer a similar valuable aqueous dispersion is obtained. The total solids of the dispersions in each case may be controlled by the amount of water which is employed to dilute the paste. When the above example is repeated with an elastomeric polyurethane, prepared by reacting one mole of polytetramethylene ether glycol of a molecular weight of about 3000, 2.3 moles of 2,4-tolylene diisocyanate and 1.2 moles of water, and with the same two interpolymer derivatives, similar valuable aqueous dispersions of the polyurethane in water are obtained.

*Example IV*

A chlorosulfonated polyethylene having a chlorine content of 27.5%, a sulfur content of 1.5% and a Mooney value of 40 ML is placed on a two roll rubber mill and to 100 weight parts thereof there is added 5 weight parts of stearic acid and 3.5 weight parts of the partial lauryl ester of an interpolymer of maleic anhydride-methyl vinyl ether-allyl sucrose. This mixture is then placed in a Banbury type mixer and concentrated ammonium hydroxide diluted with water is slowly added thereto until a paste forms. At this point additional water is slowly added until an aqueous dispersion containing about 50% total solids is obtained. Further amounts of water are added as desired to obtain more fluid and less concentrated dispersions of this interpolymer. These basic dispersions are quite stable and may be used to impregnate fibrous materials as well as to deposit continuous films of the elastomer.

Although this invention provides novel aqueous dispersions of valuable elastomeric polymers which ordinarily are not produced in the form of latices or aqueous dispersions, the invention also provides valuable aqueous dispersions of any other elastomeric polymers; including, for example; natural rubber; polyisoprene; copolymers containing a major proportion of butadiene-1,3 and lesser proportions of monoolefinic monomers and mixtures thereof such as styrene, acrylonitrile, acrylic and methacrylic acid, esters of methacrylic and acrylic acids, vinylidene chloride and the like; polyacrylic acid esters such as polyethylacrylate; chloroprene polymers; the polysulfide elastomers; elastic polyesters; silicon elastomers; and the like. While the above listed elastomers can be readily produced in the form of latices, it is often desirable to resuspend the dry bulk polymers in water. In such a case the present invention is extremely valuable and applicable.

*Example V*

To 100 weight parts of a copolymer of a monomer mixture of 65% 1,3-butadiene and 35% acrylonitrile on a two roll rubber mill is added 5 weight parts of stearic acid and 3.5 weight parts of the partial lauryl ester of an interpolymer of maleic anhydride-methyl vinyl ether-allyl sucrose. This mixture is placed in an internal type mixer and ammonium hydroxide diluted with water is slowly added thereto until a paste forms. At this point additional water is slowly added until an aqueous dispersion containing the desired total solids, about 25-50%, is obtained. Further amounts of water are added as desired to obtain more fluid and less concentrated stable dispersions of this interpolymer.

*Example VI*

100 weight parts of natural rubber and 5 weight parts of stearic acid and 3.5 weight parts of the partial lauryl ester of an interpolymer of maleic anhydride-methyl vinyl ether-allyl sucrose are mixed together. This mixture is then placed in a dough-type mixer and ammonium hydroxide diluted with water is slowly added thereto while mixing until a paste forms. At this point additional water is slowly added until an aqueous dispersion containing about 50% total solids is obtained. Further amounts of water are added as desired to obtain more fluid and less concentrated dispersions of this interpolymer. These dispersions are quite stable.

*Example VII*

100 weight parts of a brominated (2.5 to 3.0% bromine) interpolmer of 97.5% isobutylene and 2.5% isoprene, 5 weight parts of stearic acid and 3.5 weight parts of a 10% lauryl ester of an interpolymer of maleic anhydride and methyl vinyl ether cross-linked with 1% of allyl sucrose, are milled together on a two roll rubber mill. This mixture is placed in an internal mixer and dilute ammonium hydroxide is slowly added. After a paste forms, additional water is added until the dispersion contains 45% total solids.

As is apparent from the above embodiments, the amount of water employed in the elastomer dispersions may be varied quite widely. Ordinarily about 50 or more weight parts of water are required to obtain dispersion of elastomer in water, and preferably the amount is about 100 or more weight parts of water per 100 weight parts of elastomer. Amounts of water as high as 500 weight parts or higher may be used to obtain particular total solids concentrations and viscosities desired or required in the dispersions. Preferably the amount of water in the dispersions of this invention is from about 100 to about 300 weight parts per 100 weight parts of elastomer.

When the above procedures are repeated with other elastomeric polymers, other water-insoluble cross-linked interpolymer ester derivatives and other fatty acids of the types and nature set forth hereinabove, similar valuable stable aqueous dispersions of elastomeric polymers are obtained. The dispersions of this invention are useful in preparing articles directly by known methods such as dipping applications and are particularly valuable in coating cords and fabrics, both knitted and woven, for use in tire construction, belt construction and similar reinforced rubber articles.

Although representative embodiments of the invention have been specifically set forth hereinabove it is not intended to limit the invention solely thereto as it will be apparent to the man skilled in the art that there are other variations of the described products and process. It is our intention, therefore, that this invention be limited solely by the scope and spirit of the appended claims.

We claim:

1. A stable aqueous dispersion comprising in addition to a continuous phase of water the following other premixed ingredients: (1) a solid polymer having elastic, rubber-like properties and having a Mooney viscosity value, as determined after 4 minutes at 212° F. using the large rotor, from 25 to 150, said polymer being selected from the class consisting of (a) polyisoprenes (b) polychloroprenes (c) butadiene-1,3 copolymers containing a major proportion of copolymerized butadiene-1,3 (d) interpolymers of 70 to 99% by weight of an isoolefin containing from 4 to 8 carbon atoms and the balance of a polyolefin containing 4 to 18 carbon atoms (e) brominated interpolymers as defined in (d) containing 1 to 5% combined bromine (f) polyurethanes prepared by reacting a polyisocyanate with a material of the class consisting of polyesters, polyesteramides and polyetherglycols and (g) chlorinated polyethylenes containing 25 to 30% chlorine (2) a solid water-insoluble cross-linked interpolymer ester derivative prepared by esterifying, with an alcohol selected from the class consisting of primary aliphatic alcohols containing 6 to 18 carbon atoms and aliphatic tertiary amino alcohols containing 4 to 10 carbon atoms, from 10 to 50% of the carboxylic groups present in an interpolymer of a monomeric mixture comprising substantially equimolar proportions of (a) a dicarboxylic acid anhydride of the formula

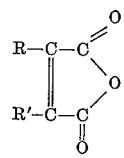

wherein R and R' are selected from the group consisting of hydrogen, halogen and alkyl, aryl, alkaryl, aralkyl and cycloalkyl hydrocarbon groups and (b) a vinyl alkyl ether containing from 3 to 10 carbon atoms, together with 0.1 to 5% based on the combined weight of (a) and (b) of a cross-linking agent which is a polyallyl polyether of a polyhydric alcohol containing at least 4 carbon atoms and at least 3 hydroxyl groups, said polyallyl polyether possessing an average of at least two allyl ether groups per molecule (3) an aliphatic monocarboxylic acid containing from 12 to 30 carbon atoms and (4) a base selected from the class consisting of sodium, potassium and ammonium hydroxides; there being present in said dispersion, for each 100 parts by weight of (1), from 1 to 10 parts by weight of each of (2) and (3), from 50 to 500 parts by weight of water and sufficient (4) to maintain the dispersion at a pH greater than 7.

2. A dispersion according to claim 1 in which the dicarboxylic acid anhydride of ingredient (2) is maleic anhydride.

3. A dispersion according to claim 2 further characterized in that the interpolymer of ingredient (2) is prepared from maleic anhydride, methyl vinyl ether and polyallyl sucrose.

4. A dispersion according to claim 3 further characterized in that the alcohol for esterification in ingredient (2) is lauryl alcohol.

5. A dispersion according to claim 3 further characterized in that ingredient (3) is stearic acid and ingredient (4) is ammonium hydroxide.

6. A dispersion according to claim 5 further characterized in that ingredient (1) is an interpolymer of 95 to 99% by weight isobutylene and 1 to 5% by weight isoprene.

7. A dispersion according to claim 5 further characterized in that ingredient (1) is a brominated interpolymer of 95 to 99% by weight isobutylene and 1 to 5% by weight isoprene containing 1 to 5% by weight based on the total weight of bromine.

8. A dispersion according to claim 5 further characterized in that ingredient (1) is a polyester urethane prepared by reacting one mole of hydroxyl polyethylene adipate of molecular weight about 1200 with 0.3 mole water and 1.25 moles of paraphenylene diisocyanate.

9. A dispersion according to claim 5 further characterized in that ingredient (1) is chlorosulfonated polyethylene having a chlorine content of 27.5% and a sulfur content of 1.5%.

10. A dispersion according to claim 5 further characterized in that ingredient (1) is a polyisoprene.

11. The method for preparing the aqueous dispersion of claim 1 which comprises intimately mixing together ingredients (1) (2) and (3) of claim 1, in the proportions of claim 1, adding to the resulting mixture sufficient of ingredient (4) of claim 1 to adjust the pH of the mixture to a value of 8 to 11, and then diluting the mixture with water.

References Cited in the file of this patent

UNITED STATES PATENTS

| | | |
|---|---|---|
| 2,433,849 | Lathrop | Jan. 6, 1948 |
| 2,647,886 | Seymour | Aug. 4, 1953 |
| 2,755,272 | Lambert et al. | July 17, 1956 |
| 2,798,062 | Cantois | July 2, 1957 |

OTHER REFERENCES

Parkington: "Textbook of Inorganic Chemistry," MacMillan and Co., London (1950), page 76.